(12) United States Patent
Bao et al.

(10) Patent No.: US 11,507,293 B2
(45) Date of Patent: Nov. 22, 2022

(54) METHOD, ELECTRONIC DEVICE AND COMPUTER PROGRAM PRODUCT FOR MANAGING STORAGE BLOCKS

(71) Applicant: EMC IP Holding Company LLC, Hopkinton, MA (US)

(72) Inventors: Haiyun Bao, Beijing (CN); Geng Han, Beijing (CN); Shaoqin Gong, Beijing (CN); Jianbin Kang, Beijing (CN); Jian Gao, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 17/464,106

(22) Filed: Sep. 1, 2021

(65) Prior Publication Data
US 2022/0229557 A1    Jul. 21, 2022

(30) Foreign Application Priority Data

Jan. 21, 2021   (CN) .......................... 202110081637.8

(51) Int. Cl.
*G06F 3/06*    (2006.01)
(52) U.S. Cl.
CPC ............ *G06F 3/064* (2013.01); *G06F 3/0604* (2013.01); *G06F 3/0679* (2013.01)

(58) Field of Classification Search
CPC ....... G06F 3/064; G06F 3/0604; G06F 3/0679
See application file for complete search history.

(56) References Cited

U.S. PATENT DOCUMENTS

| | | | |
|---|---|---|---|
| 8,838,931 B1 | 9/2014 | Marshak et al. | |
| 9,898,224 B1* | 2/2018 | Marshak | ............... G06F 3/0647 |
| 10,657,066 B2 | 5/2020 | Han et al. | |
| 11,010,082 B2 | 5/2021 | Nanda et al. | |
| 2016/0098345 A1* | 4/2016 | Cho | ....................... G06F 12/023 711/170 |

* cited by examiner

*Primary Examiner* — Francisco A Grullon
(74) *Attorney, Agent, or Firm* — BainwoodHuang (57) ABSTRACT

Techniques for managing storage blocks involve: according to a first request for allocating a target number of consecutive storage blocks from a storage device, querying an index table that is used to record index information of a plurality of groups of consecutive idle storage blocks in the storage device to determine a first group of consecutive idle storage blocks from the plurality of groups of consecutive idle storage blocks; allocating the target number of consecutive storage blocks from the first group of consecutive idle storage blocks; updating a bitmap that is used to record states of a plurality of storage blocks in the storage device; and updating first index information of the first group of consecutive idle storage blocks recorded in the index table. Accordingly, such techniques may reduce storage complexity and improve system performance.

23 Claims, 8 Drawing Sheets

METHOD, ELECTRONIC DEVICE AND COMPUTER PROGRAM PRODUCT FOR MANAGING STORAGE BLOCKS

CROSS-REFERENCE TO RELATED APPLICATION

This application claims priority to Chinese Patent Application No. CN202110081637.8, on file at the China National Intellectual Property Administration (CNIPA), having a filing date of Jan. 21, 2021, and having "METHOD, ELECTRONIC DEVICE AND COMPUTER PROGRAM PRODUCT FOR MANAGING STORAGE BLOCKS" as a title, the contents and teachings of which are herein incorporated by reference in their entirety.

TECHNICAL FIELD

Embodiments of the present disclosure generally relate to the field of data storage, and in particular, to a method, an electronic device, and a computer program product for managing storage blocks.

BACKGROUND

In a storage system, performance of metadata input/output (I/O) and user data I/O is critical to system performance. Generally, the mode of metadata I/O is more variable than that of user data I/O, because a size of metadata I/O is much smaller than a size of user data I/O, and metadata I/O is inconsecutive. In the storage system after long-term use, idle storage blocks on solid state drives (SSDs) or mechanical hard drives (HDDs) are often inconsecutive. How to efficiently find storage blocks or properly release storage blocks in processes of metadata I/O and user data I/O becomes a bottleneck that limits I/O performance of data in the storage system. Therefore, a solution for effectively managing storage blocks is needed.

SUMMARY OF THE INVENTION

The embodiments of the present disclosure provide a method, an electronic device, and a computer program product for managing storage blocks.

In a first aspect of the present disclosure, a method for managing storage blocks is provided. The method includes: according to a first request for allocating a target number of consecutive storage blocks from a storage device, querying an index table that is used to record index information of multiple groups of consecutive idle storage blocks in the storage device to determine a first group of consecutive idle storage blocks from the multiple groups of consecutive idle storage blocks, where the index information of each group of consecutive idle storage blocks indicates a number and a starting position of each group of consecutive idle storage blocks, and the number of the first group of consecutive idle storage blocks is not less than the target number; allocating the target number of consecutive storage blocks from the first group of consecutive idle storage blocks; updating a bitmap that is used to record states of a plurality of storage blocks in the storage device, where the state of each storage block indicates that each storage block is one of the following: an allocated storage block, a starting idle storage block and/or an ending idle storage block in a group of consecutive idle storage blocks, or an intermediate idle storage block in a group of consecutive idle storage blocks; and updating first index information of the first group of consecutive idle storage blocks recorded in the index table.

In a second aspect of the present disclosure, an electronic device is provided. The device includes at least one processing unit and at least one memory. The at least one memory is coupled to the at least one processing unit and stores instructions configured to be executed by the at least one processing unit. The instructions, when executed by at least one processing unit, cause the device to perform actions. The actions include: according to a first request for allocating a target number of consecutive storage blocks from a storage device, querying an index table that is used to record index information of multiple groups of consecutive idle storage blocks in the storage device to determine a first group of consecutive idle storage blocks from the multiple groups of consecutive idle storage blocks, where the index information of each group of consecutive idle storage blocks indicates a number and a starting position of each group of consecutive idle storage blocks, and the number of the first group of consecutive idle storage blocks is not less than the target number; allocating the target number of consecutive storage blocks from the first group of consecutive idle storage blocks; updating a bitmap that is used to record states of a plurality of storage blocks in the storage device, where the state of each storage block indicates that each storage block is one of the following: an allocated storage block, a starting idle storage block and/or an ending idle storage block in a group of consecutive idle storage blocks, or an intermediate idle storage block in a group of consecutive idle storage blocks; and updating first index information of the first group of consecutive idle storage blocks recorded in the index table.

In a third aspect of the present disclosure, a computer program product is provided. The computer program product is tangibly stored on a non-transitory computer-readable medium and includes machine-executable instructions; and when executed, the machine-executable instructions cause a machine to perform any step of the method described according to the first aspect of the present disclosure.

The Summary of the Invention section is provided to introduce the selection of concepts in a simplified form, which will be further described in the Detailed Description below. The Summary of the Invention section is neither intended to identify key features or essential features of the present disclosure, nor intended to limit the scope of the present disclosure.

BRIEF DESCRIPTION OF THE DRAWINGS

The above and other objectives, features, and advantages of the present disclosure will become more apparent by describing example embodiments of the present disclosure in detail with reference to the accompanying drawings, and in the example embodiments of the present disclosure, the same reference numerals generally represent the same components. In the accompanying drawings.

The same or corresponding reference numerals in the various accompanying drawings represent the same or corresponding portions.

DETAILED DESCRIPTION

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

It should be understood that the specialized circuitry that performs one or more of the various operations disclosed herein may be formed by one or more processors operating in accordance with specialized instructions persistently stored in memory. Such components may be arranged in a variety of ways such as tightly coupled with each other (e.g., where the components electronically communicate over a computer bus), distributed among different locations (e.g., where the components electronically communicate over a computer network), combinations thereof, and so on.

Preferred embodiments of the present disclosure will be described in more detail below with reference to the accompanying drawings. Although the preferred embodiments of the present disclosure are shown in the accompanying drawings, it should be understood that the present disclosure can be implemented in various forms and should not be limited by the embodiments set forth herein. Rather, these embodiments are provided to make the present disclosure more thorough and complete and to fully convey the scope of the present disclosure to those skilled in the art.

The term "include" and variants thereof used herein indicate open-ended inclusion, that is, "including but not limited to." Unless specifically stated, the term "or" means "and/or." The term "based on" means "based at least in part on." The terms "an example embodiment" and "an embodiment" indicate "at least one example embodiment." The term "another embodiment" indicates "at least one additional embodiment." The terms "first," "second," and the like may refer to different or the same objects. Other explicit and implicit definitions may also be included below.

Conventionally, in a storage system, two index tables are used to manage allocation of storage blocks. The first index table contains information of idle storage blocks and records the number of consecutive idle storage blocks and a starting position of the consecutive idle storage blocks. The second index table contains information about allocated storage blocks, and records starting and ending positions of the allocated storage blocks. To allocate a storage block, a best-matched idle storage block is found in the first index table. To release a storage block, the released storage block is searched in the second index table and deleted from the index table, and then information of idle storage blocks is updated in the first index table. Complexities of the operations of managing storage blocks are all $O(1n^n)$, where n is the number of allocated storage blocks. Since most of storage blocks are allocated storage blocks when the storage system is in a normal operating state, that is, n is relatively large, the complexity of the operation of managing storage blocks is high, which becomes a bottleneck that limits performance of the storage system.

In order to at least partially solve the above problems and one or more of other potential problems, a solution for managing storage blocks is proposed in the example embodiments of the present disclosure. In this solution, according to a request for allocating a target number of consecutive storage blocks in a storage device, index information of idle storage blocks is queried in the index table to determine a group of consecutive idle storage blocks used to allocate the target number of consecutive storage blocks. The target number of consecutive storage blocks may be allocated from the group of consecutive idle storage blocks. A bitmap used to record states of multiple storage blocks in the storage device is updated, where the state of each storage block indicates that the storage block is an allocated storage block or a starting idle storage block, an intermediate idle storage block, or an ending idle storage block in a group of consecutive idle storage blocks. In addition, the index information of the aforementioned group of consecutive idle storage blocks recorded in the index table may be updated. In this way, the solution can reduce operational complexities of storage block allocation and recycling, and improve performance of the storage system.

Figure 1:
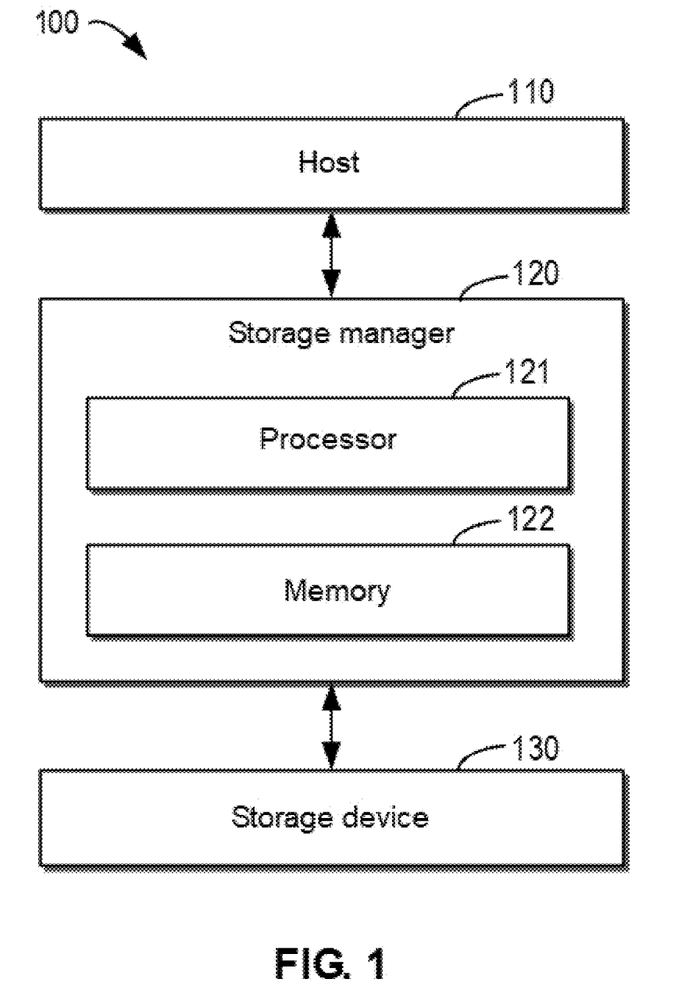
FIG. 1 shows a schematic diagram of an example environment in which an embodiment of the present disclosure may be implemented.

In the following, specific examples of the solution will be described in more detail in conjunction with the accompanying drawings. FIG. 1 shows a schematic diagram of an example of storage system 100 according to an embodiment of the present disclosure. FIG. 1 shows a block diagram of example environment 100 in which the embodiments of the present disclosure can be implemented. As shown in FIG. 1, environment 100 includes host 110, storage manager 120, and storage device 130. It should be understood that the structure and functions of environment 100 are described for illustrative purposes only and do not imply any limitation to the scope of the present disclosure. For example, the embodiments of the present disclosure may also be applied to an environment different from environment 100.

Storage system 130 may include one or more storage spaces, such as magnetic disks, optical disks, hard driver disks (HDDs), or solid state disks (SSDs). Each storage space may be divided into a plurality of storage blocks. For example, each of the storage blocks may have the same size. According to different types of stored data or according to divided logical layers, storage system 130 may include various types of storage blocks, for example, a storage block for storing user data (also called a "user data storage block"), a storage block for storing metadata related to a storage system (also called a "metadata storage block"), etc. The metadata storage block may store mapping information, index information, state information, etc. related to the storage system, such as mapping information from storage blocks to physical disks and states of the storage blocks (such as normal states or failure states). Data stored in the multiple storage blocks in storage device 130 may be correlated with each other.

Storage manager 120 may include processor 121 and memory 122. Memory 122 may be any volatile storage medium, non-volatile storage medium, or a combination thereof, which is currently known or to be developed in the future. Storage manager 120 may be configured to manage storage device 130 and process input/output (I/O) requests from host 110. Host 110 may be any physical computer, virtual machine, server, etc. that runs user applications.

Storage manager 120 may allocate storage blocks from storage device 130 according to I/O requests from the host, or recycle the storage blocks that are no longer used for subsequent use. Generally, allocation of the storage blocks is consecutive and recycling of the storage blocks is inconsecutive. That is, multiple consecutive storage blocks may be allocated at one time, and one or more inconsecutive storage blocks may be recycled each time. In some embodiments, storage manager 120 may use an index table that is used to record index information of idle storage blocks in storage device 130 and a bitmap that is used to record a state of each storage block to manage allocation and recycling of storage blocks. The allocation/recycling of storage blocks will be described in detail below in conjunction with FIG. 2 to FIG. 5.

Figure 2:
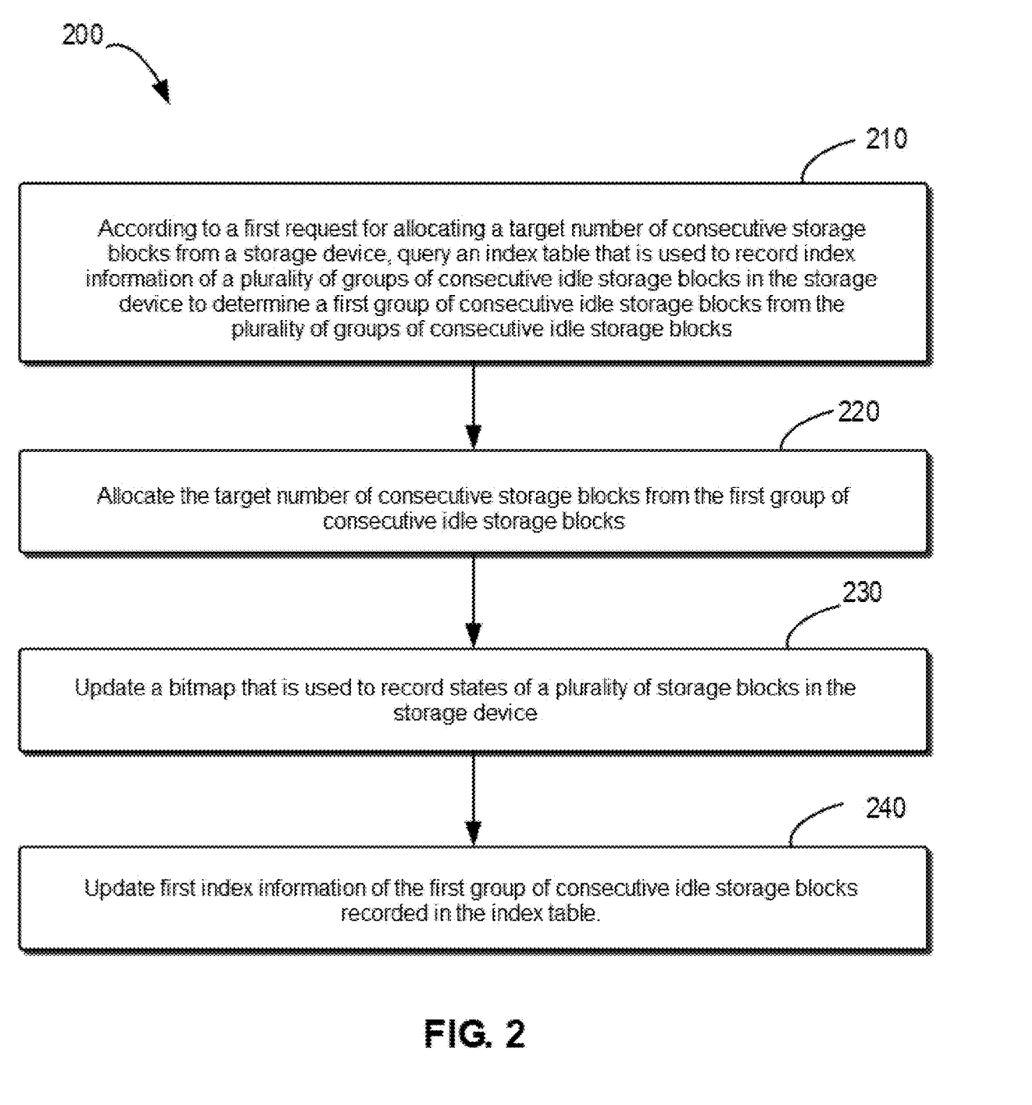
FIG. 2 shows a flow chart of a method for allocating storage blocks according to an embodiment of the present disclosure.

FIG. 2 shows a flow chart of example method 200 for allocating storage blocks according to an embodiment of the present disclosure. Method 200 may be executed, for example, by storage manager 120 as shown in FIG. 1. It should be understood that method 200 may also include additional actions not shown and/or may omit actions shown, and the scope of the present disclosure is not limited in this regard. Method 200 is described in detail below in conjunction with FIG. 1 to FIG. 5.

As shown in FIG. 2, at block 210, according to a first request to allocate a target number of consecutive storage blocks from a storage device, storage manager 120 queries index table 310 that is used to record index information of multiple groups of consecutive idle storage blocks in storage device 130 to determine a first group of consecutive idle storage blocks from the multiple groups of consecutive idle storage blocks.

Figure 3:
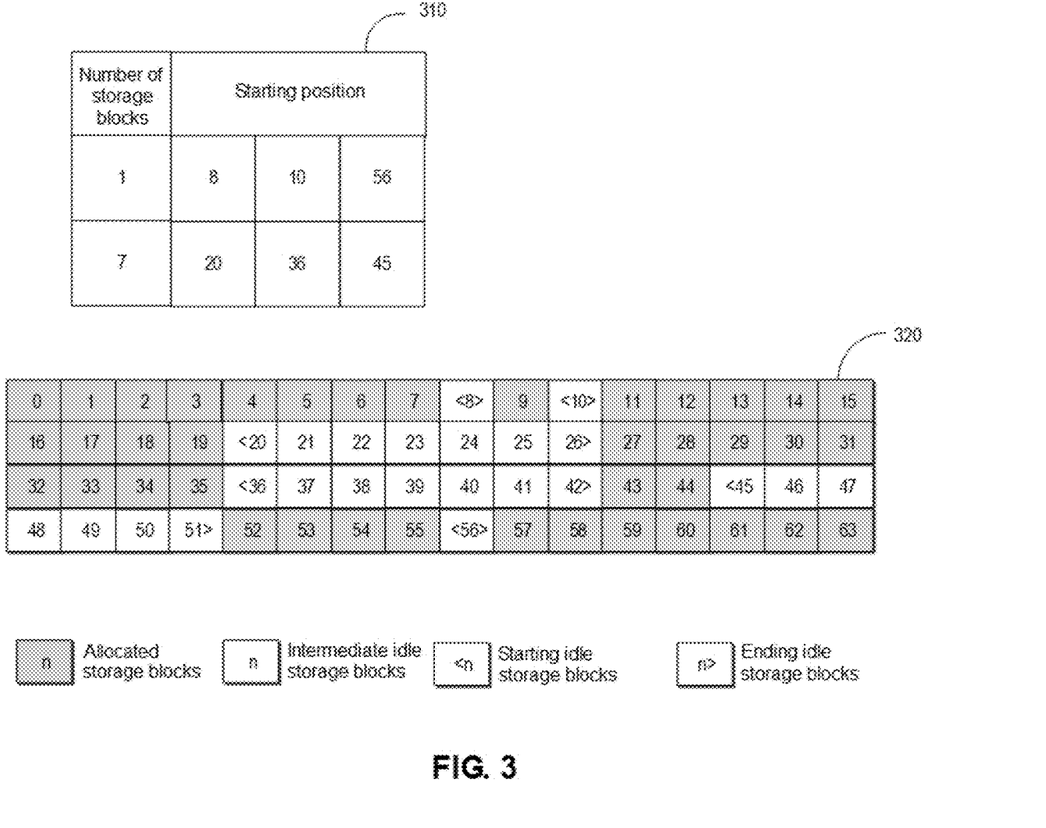
FIG. 3 shows an example data structure for managing storage blocks according to an embodiment of the present disclosure.

Some basic concepts are described first in conjunction with FIG. 3. FIG. 3 shows an example data structure for managing storage blocks, including index table 310 and bitmap 320, according to an embodiment of the present disclosure. Index table 310 is used to record index information of multiple groups of consecutive idle storage blocks in storage device 130. The index information indicates the number and the starting position of each group of consecutive idle storage blocks. For example, referring to index table 310, indexes, recorded therein, of starting positions of consecutive idle storage blocks whose number of storage blocks is 1 are 8, 10, and 56, that is, there are individual idle storage blocks 8, 10, and 56 available for allocation. Indexes, recorded in index table 310, of starting positions of consecutive idle storage blocks whose number of storage blocks is 7 are 20, 36, and 45, that is, there are 7 consecutive idle storage blocks available for allocation starting from the storage blocks 20, 36, and 45.

Bitmap 320 is used to record states of multiple storage blocks in storage device 130. The state of each storage block in bitmap 320 indicates that each storage block is one of the following: an allocated storage block, a starting idle storage block and/or an ending idle storage block in a group of consecutive idle storage blocks, or an intermediate idle storage block in a group of consecutive idle storage blocks. This state is represented by setting bits for each storage block in the bitmap, that is, each storage block is represented with 2 bits. In FIG. 3, gray blocks indicate that they are allocated storage blocks, and white blocks indicate that they are idle storage blocks. In a bitmap, low and high bits are respectively set in a starting idle storage block and an ending idle storage block among consecutive idle storage blocks. For example, a bit "10" represents a starting idle storage block (graphically marked as <), and a bit "01" represents an ending idle storage block (graphically marked as >), and if there are only individual idle storage blocks such as storage blocks 8, 10 and 56, then high and low bits "11" are set at the same time (graphically marked as <>). For allocated storage blocks and intermediate idle storage blocks, neither a high bit nor a low bit is set, that is, they are represented by a bit "00" (there is no identifier in the figure). The difference lies in that the allocated storage blocks are between a high bit and a low bit (i.e., between ><), while the idle storage blocks are between a low bit and a high bit (i.e., between <>).

It should be noted that the above-mentioned index table 310 and bitmap 320 are only by way of example, and the number and positions of the allocated storage blocks and idle storage blocks, and bit setting identifiers of the storage blocks are not intended to limit the scope of the present disclosure. Different storage systems may have different allocation states of storage blocks.

Return to block 210 for description. In an example, storage manager 120 receives a request from host 110 to allocate 4 consecutive storage blocks from storage device 130. Storage manager 120 queries index table 310 for index information of multiple groups of consecutive idle storage blocks. Storage manager 120 obtains more than four storage blocks which are consecutive in space from index table 310, thereby determining a first group of consecutive idle storage blocks for allocating the four consecutive storage blocks, that is, storage manager 120 determines 7 consecutive idle storage blocks starting from a storage block with an index of 20 as a first group of consecutive idle storage blocks. It is to be noted that in order to ensure the allocation of storage blocks, the number of the first group of consecutive idle storage blocks shall not be less than a target number, and 7 consecutive idle storage blocks starting from a storage block with an index 36 or 45 may be a first group of consecutive idle storage blocks. The present disclosure is not limited herein.

At block 220, storage manager 120 allocates a target number of consecutive storage blocks from a first group of consecutive idle storage blocks. In the above example, for example, storage manager 120 may allocate 4 consecutive storage blocks from 7 consecutive idle storage blocks starting from a storage block with an index of 20.

Figure 4:
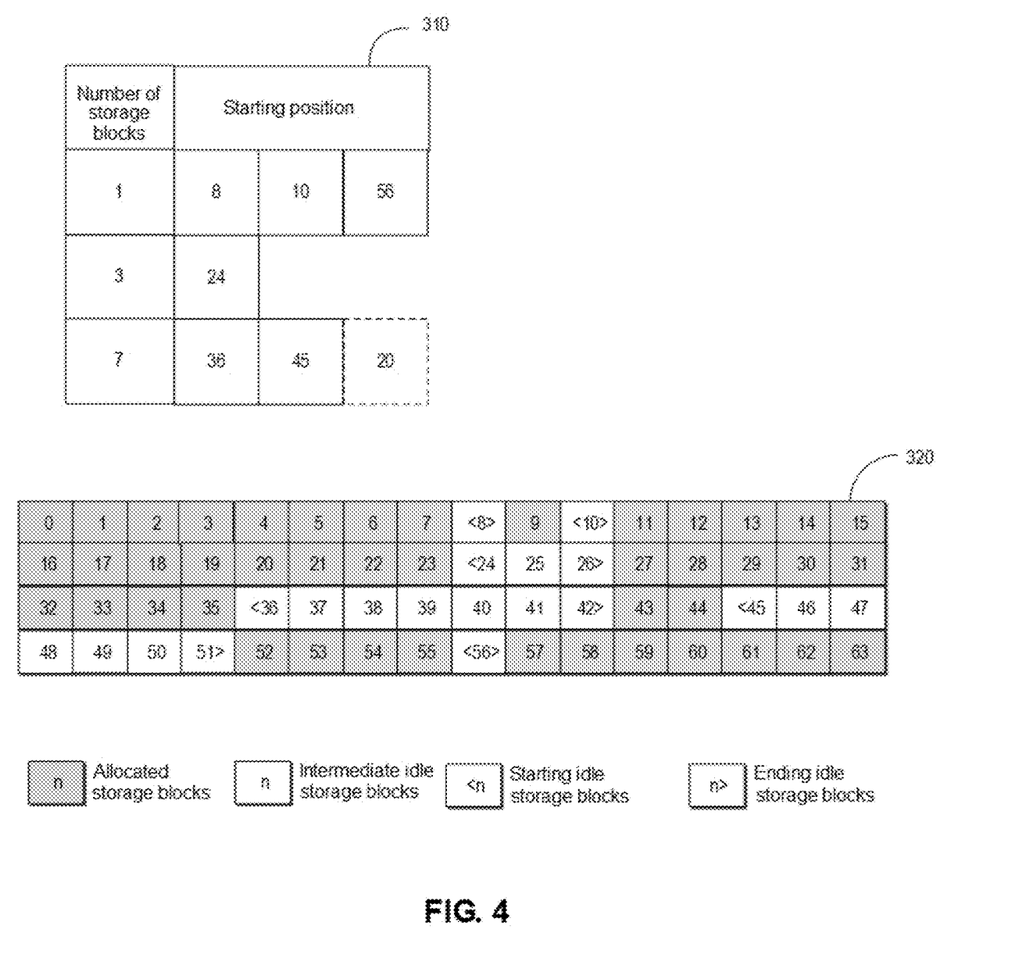
FIG. 4 shows an example data structure for managing storage blocks according to an embodiment of the present disclosure.

In response to a target number of consecutive storage blocks being allocated, at block 230, storage manager 120 updates a bitmap used to record states of the multiple storage blocks in storage device 130. For example, depending on a relationship between the number of the first group of consecutive idle storage blocks and the target number, there may be different update procedures. The following will be described in conjunction with FIG. 4. FIG. 4 shows index table 310 and bitmap 320 that are updated according to the embodiments of the present disclosure.

In some embodiments, storage manager 120 determines that the number of a first group of consecutive idle storage blocks exceeds a target number. In this case, the allocation of 4 consecutive storage blocks from 7 consecutive idle storage blocks starting from storage block 20 is still taken as an example. Storage manager 120 first updates the state of starting first idle storage block 20 in a first group of consecutive idle storage blocks 20 to 26 to indicate that the first idle storage block 20 is an allocated storage block. For example, storage manager 120 removes a low bit set in storage block 20 in bitmap 320 in FIG. 3, so that the state thereof is updated to an allocated storage block as shown in bitmap 420 in FIG. 4. Then, storage manager 120 determines at least one of remaining consecutive idle storage blocks 24 to 26 from consecutive idle storage blocks 20 to 26 in the first group of consecutive idle storage blocks. For example, storage manager 120 determines that the difference between the number of the first group of consecutive idle storage blocks and the target number is 3, and then it determines 3 remaining consecutive idle storage blocks 24 to 26. Finally, storage manager 120 updates the state of starting second idle storage block 24 among at least one of consecutive idle storage blocks 24 to 26 to indicate that the second idle storage block 24 is a starting idle storage block of a group of consecutive idle storage blocks 24 to 26. Storage manager 120 may set a low bit to the first idle storage block 24 in the remaining consecutive idle storage blocks to indicate that the first idle storage block 24 is a starting idle storage block. Bitmap 320 that is updated is shown in FIG. 4. It can be seen that a complexity of the above operation for allocating storage blocks is O(1). In a storage system under general conditions (or in the best operating state), since the number of allocated storage blocks n is much greater than 1, a complexity of the above-mentioned operation for the bitmap is much less than a complexity $O(1n'')$ of operating the index table that contains information of the allocated storage blocks.

Alternatively, in some embodiments, storage manager 120 determines that the number of first group of consecutive idle storage blocks exceeds a target number. For example, it is assumed that storage manager 120 will allocate 7 consecutive storage blocks from 7 consecutive idle storage blocks starting from storage block 20. Storage manager 120 updates states of starting first idle storage block 20 and ending third idle storage block 26 in a first group of consecutive idle storage blocks 20 to 26, to indicate that both the first idle storage block and the fourth idle storage block are allocated storage blocks. For example, storage manager 120 may remove low and high bits in first idle storage block 20 and third idle storage block 26. A complexity of the above operation for allocating storage blocks is also O(1).

The above embodiments are only by way of example, and there may be other possible cases of storage block allocation. In various cases of storage block allocation, a complexity of bitmap operation is always O(1). It can be seen that by using the bitmap to replace the index table containing information of allocated storage blocks, the operational complexity in storage block allocation may be reduced and the performance of the storage system may be improved.

At block 240, storage manager 120 updates first index information of the first group of consecutive idle storage blocks recorded in index table 310. After bitmap 320 is updated, storage manager 120 is also required to update index table 310.

In some embodiments, storage manager 120 determines that the number of a first group of consecutive idle storage blocks exceeds a target number. In such case, storage manager 120 updates the first index information to record the number of at least one consecutive idle storage block and the position of a second idle storage block. For example, in the example of FIG. 4, storage manager 120 determines that the number of at least one of consecutive idle storage blocks 24 to 26 is 3 and storage block 24 is a starting second idle storage block, and 2 and 24 are respectively recorded in updated index table 410. In the meantime, since the original 7 consecutive idle storage blocks have been partially allocated, storage manager 120 further removes storage block 20 from index table 310. Updated index table 310 is shown in FIG. 4. The dotted line in index table 410 represents the deleted information.

Alternatively, in some embodiments, storage manager 120 determines that the number of first group of consecutive idle storage blocks exceeds a target number. In this case, since the first group of consecutive idle storage blocks are all allocated, storage manager 120 may remove first index information of the first group of consecutive idle storage blocks from the index table.

Thus, by introducing the bitmap, the operational complexity required for storage block allocation is greatly reduced. The process of storage block allocation is described above. Various embodiments of storage block recycling are described below in conjunction with FIG. 5 to FIG. 7.

Figure 5:
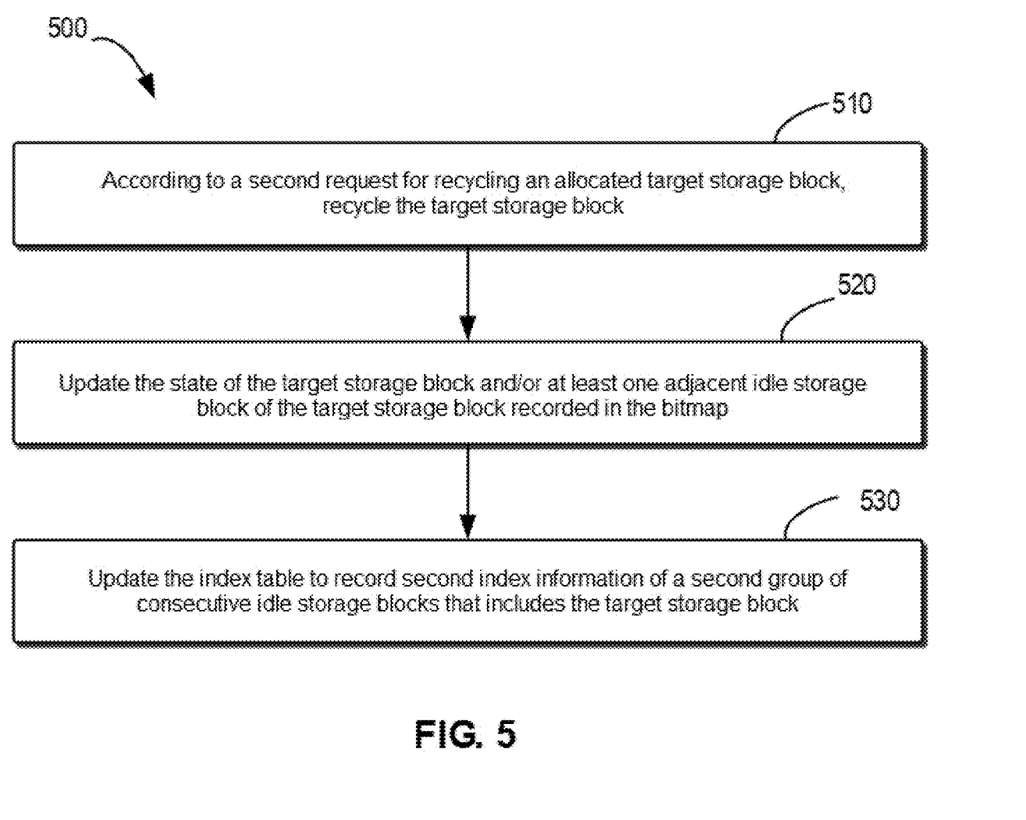
FIG. 5 shows a flow chart of a method for recycling storage blocks according to an embodiment of the present disclosure.

FIG. 5 shows a flow chart of example method 500 for recycling storage blocks according to an embodiment of the present disclosure. Method 500 may be executed, for example, by storage manager 120 shown in FIG. 1. It should be understood that method 500 may also include additional actions not shown and/or omit actions shown, and the scope of the present disclosure is not limited in this regard.

As shown in FIG. 5, at block 510, storage manager 120 recycles a target storage block according to a second request for recycling the allocated target storage block. For example, storage manager 120 removes metadata corresponding to user data from a metadata storage block in response to a user data deletion request of host 110.

In response to the recycle of the target storage block, at block 520, storage manager 120 updates the state of a target storage block and/or at least one adjacent idle storage block of the target storage block recorded in a bitmap.

In some embodiments, if it is determined that a fourth idle storage block immediately before a target storage block exists and a fifth idle storage block immediately after the target storage block does not exist, storage manager 120 may update the fourth idle storage block to indicate that the fourth idle storage block is not an ending idle storage block in a group of consecutive idle storage blocks. Then storage manager 120 updates the state of the target storage block to indicate that the target storage block is an ending idle storage block in a group of consecutive idle storage blocks. In the example shown in FIG. 4, it is assumed that the target storage block requested to be recycled is allocated storage block 11. In this case, storage manager 120 determines that fourth idle storage block 10 immediately before target storage block 11 exists and a fifth idle storage block immediately after target storage block 11 does not exist. Since fourth idle storage block 10 is a starting idle storage block and an ending idle storage block at the same time, storage manager 120 removes a high-bit identifier in fourth idle storage block 10 to indicate that it is not an ending idle storage block. Finally, the target storage block is set with a high bit to indicate that it is an ending idle storage block, as shown in bitmap 320 in FIG. 6. Similar to the above operation of allocating storage blocks, a complexity of the operation of recycling storage blocks is also O(1). The complexity is less than a complexity $O(1n'')$ of operating an index table containing information of allocated storage blocks.

Alternatively, in some embodiments, if it is determined that a fourth idle storage block does not exist but a fifth idle storage block exists, storage manager 120 may update the state of a target storage block to indicate that the target storage block is a starting idle storage block of a group of consecutive idle storage blocks. Storage manager 120 may also update the state of the fifth idle storage block to indicate that the fifth idle storage block is not a starting idle storage block in a group of consecutive idle storage blocks. In the example shown in FIG. 4, it is assumed that the target storage block requested to be recycled is allocated storage block 7. In this case, storage manager 120 determines that a fourth idle storage block immediately before target storage block 7 does not exist and fifth idle storage block 8 immediately after the target storage block exits. Since fifth idle storage block 8 is a starting idle storage block and an ending idle storage block at the same time, storage manager 120 removes a low-bit identifier in fifth idle storage block 10 to indicate that it is not a starting idle storage block. Finally, target storage block 7 is set with a low bit to indicate that it is a starting idle storage block, as shown in bitmap 320 in FIG. 6. Similar to the above operation of recycling storage blocks, a complexity of the operation of recycling storage blocks is also O(1). The complexity is less than a complexity O(1n'') of operating an index table containing information of allocated storage blocks.

Additionally or alternatively, in some embodiments, storage manager 120 determines that neither a fourth idle storage block nor a fifth idle storage block exists, and updates the state of a target storage block to indicate that the target storage block is a starting idle storage block and an ending idle storage block in a group of consecutive idle storage blocks. In the example shown in FIG. 4, it is assumed that the target storage block requested to be recycled is allocated storage block 2. In this case, storage manager 120 determines that a fourth idle storage block immediately before target storage block 2 does not exist and a fifth idle storage block immediately after the target storage block does not exist either. Storage manager 120 may simultaneously set low and high bits in the target storage block to indicate that it is a starting idle storage block and an ending idle storage block, as shown in bitmap 320 in FIG. 6. Similar to the above operation of recycling storage blocks, a complexity of the operation of recycling storage blocks is also O(1). The complexity is less than a complexity O(1n'') of operating an index table containing information of allocated storage blocks.

The above-mentioned embodiments are only by way of example, and there may be other possible cases of recycling storage blocks. In various cases of recycling storage blocks, complexities of bitmap operations are all O(1). It can be seen that by using the bitmap to replace the index table containing the information of allocated storage blocks, the operation required for storage block recycling may be simplified and the performance of the storage system may be improved.

Figure 6:
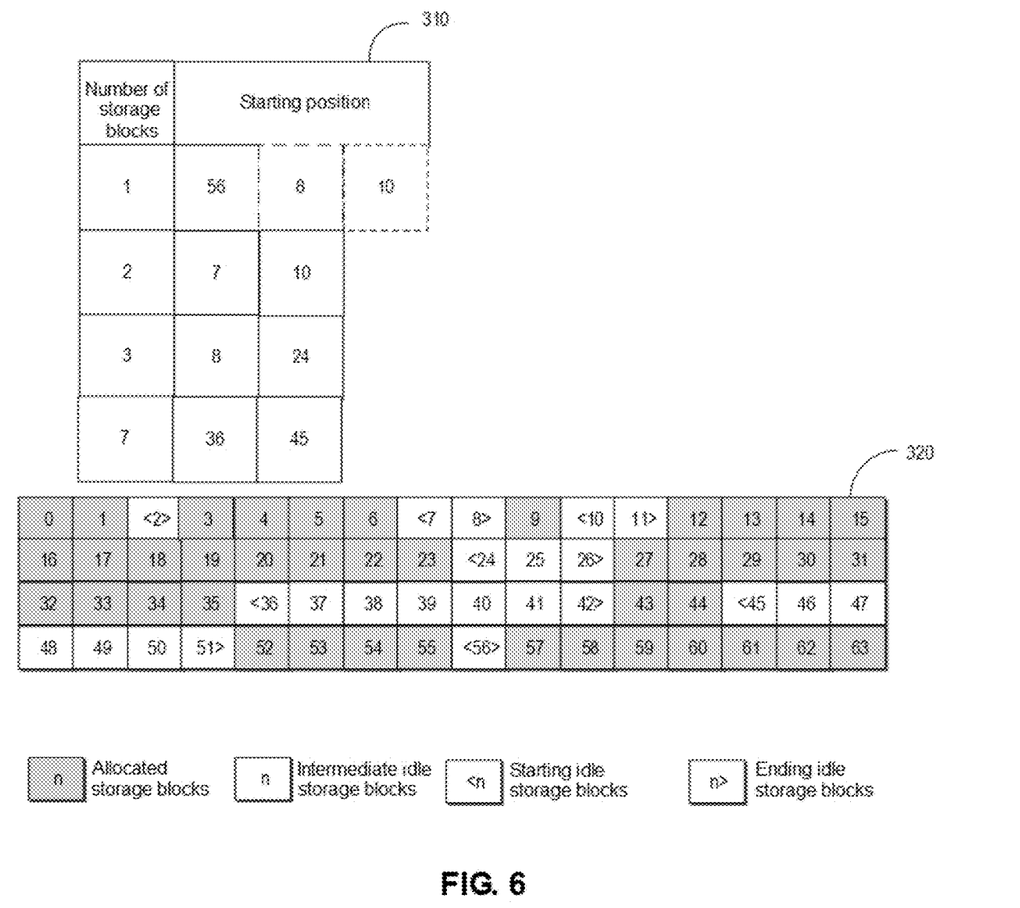
FIG. 6 shows an example data structure for managing storage blocks according to an embodiment of the present disclosure.

Returning to FIG. 5, at block 530, storage manager 120 updates an index table to record second index information of a second group of consecutive idle storage blocks including a target storage block. In some embodiments, storage manager 120 queries the updated bitmap to determine a starting sixth idle storage block and an ending seventh idle storage block in the second group of consecutive idle storage blocks; determines the number of the second group of consecutive idle storage blocks based on the sixth idle storage block and the seventh idle storage block; and updates the index table to record the number of the second group of consecutive idle storage blocks and the position of the sixth idle storage block. For example, as shown in FIG. 6, for the three cases of storage block recycling described above, storage manager 120 queries updated bitmap 320 to determine therefrom that the numbers of starting sixth idle storage blocks 2, 7, and 10 and ending seventh idle storage blocks 2, 8, and 11 in a second group of consecutive idle storage blocks <2>, <7, 8>, and <10, 11>, and the number of the second group of consecutive idle storage blocks are 1, 2, and 2, respectively. Finally, storage manager 120 updates index table 310 shown in FIG. 4 to index table 310 shown in FIG. 6 according to the above determined information. The dotted line in index table 310 in FIG. 6 represents the deleted information.

Although processes of storage block allocation, storage block recycling, and bitmap and index table updating are separately described above, this is not intended to limit the scope of the present disclosure. In actual conditions, the above cases may occur simultaneously.

Therefore, by introducing the bitmap to replace the index table containing information of the allocated storage blocks, the required operation complexity is greatly reduced regardless of whether in the case of storage block allocation or in the case of storage block recycling.

In the case discussed above, when recycling the allocated storage blocks, it is necessary to search for a starting idle storage block and an ending idle storage block among consecutive idle storage blocks in bitmap 320, to update index table 310. By using the above bitmap to operate, 32 storage blocks may be checked in one central processing unit (CPU) cycle. In most cases, that is, when most storage blocks are allocated storage blocks, a complexity of the above search operation is close to O(1). However, in some cases, if most of the storage blocks are idle storage blocks, and a range of consecutive idle storage blocks is long (that is, greater than a threshold length), the search operation may be time-consuming. An operational process of querying the bitmap in the above cases will be discussed below in conjunction with FIG. 6.

Figure 7:
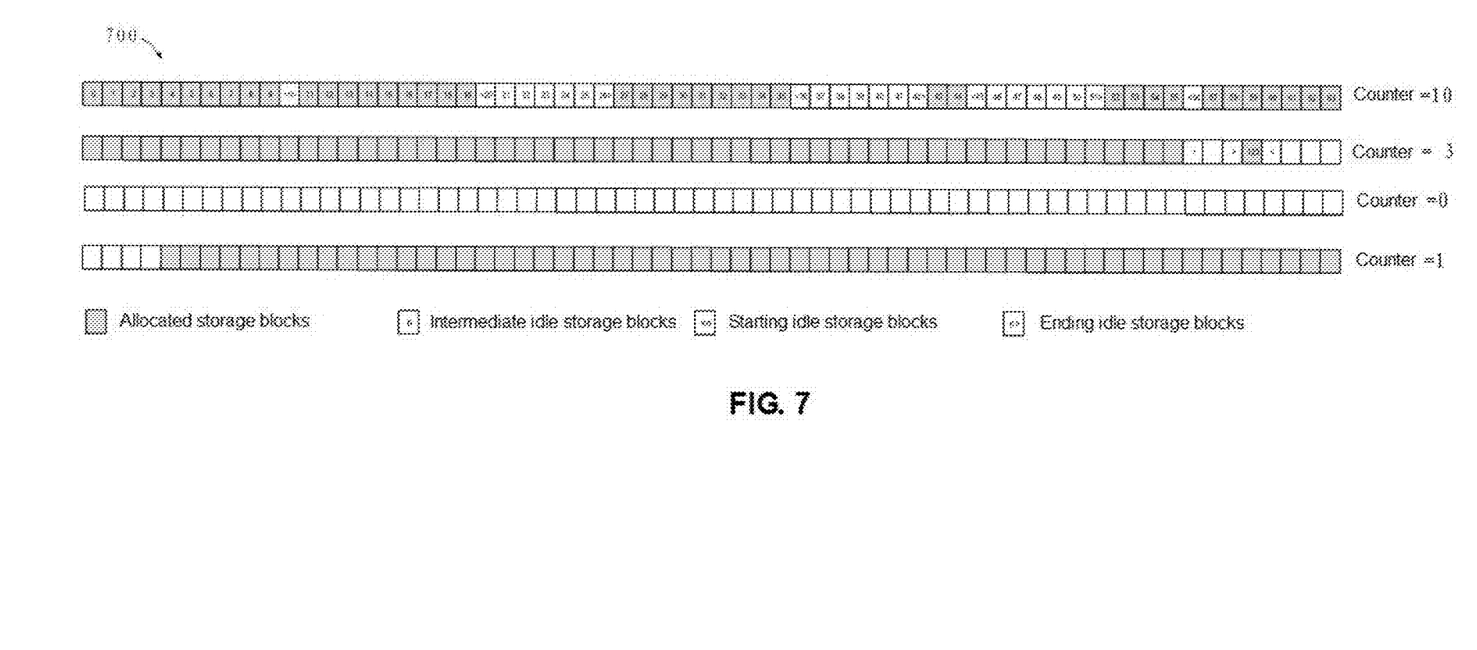
FIG. 7 shows a schematic diagram of a bitmap according to an embodiment of the present disclosure.

FIG. 7 shows schematic diagram 700 of a bitmap according to an embodiment of the present disclosure. Storage manager 120 may first divide the bitmap into multiple parts, for example, each row represents a part, where each part may represent 64 storage blocks in bitmap 320 shown in FIGS. 3, 4, and 6. Each part of the bitmap in schematic diagram 600 has a counter to record the number of starting idle storage blocks and ending idle storage blocks in the storage block corresponding to the part, for example, the number in the first row is 10, the number in the second row is 3, the number in the third row is 0, and the number in the fourth row is 1. If in response to a request of host 110, a storage block with an index of 123 in the second row is released, storage manager 120 is required to update the bitmap in schematic diagram 600. Storage manager 120 then queries the updated bitmap to update an index table corresponding thereto (for example, an index table 310, 410, or 510) according to the query information. Storage manager 120 may skip at least a part of the bitmap where the counter shows zero during the querying. For example, storage manager 120 may skip the third row where the counter shows 0. The above process is only by way of example, and in some cases, hundreds or even thousands of idle storage blocks may be skipped and do not need to be queried. Thus, the operational complexity of storage block allocation/recycling is reduced.

Figure 8:
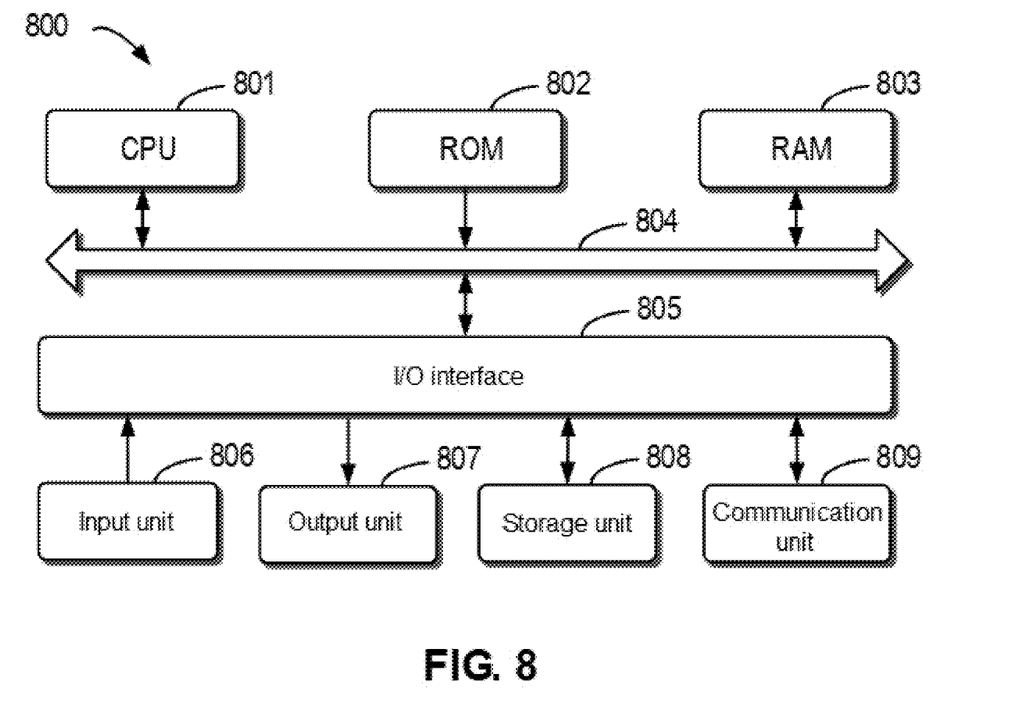
FIG. 8 shows a block diagram of an example device that may be configured to implement the embodiments of the present disclosure.

FIG. 8 shows a schematic block diagram of example device 800 that may be configured to implement the embodiments of the content of the present disclosure. For example, storage manager 120 as shown in FIG. 1 may be implemented by device 800. As shown in FIG. 8, device 800 includes central processing unit (CPU) 801, which may execute various appropriate actions and processing in accordance with computer program instructions stored in read-only memory (ROM) 802 or computer program instructions loaded onto random access memory (RAM) 803 from storage unit 808. RAM 803 may further store various programs and data required for operations of device 800. The CPU 801, ROM 802 and RAM 803 are connected to one another through bus 804. Input/output (I/O) interface 805 is also connected to bus 804.

A plurality of components in device 800 are connected to I/O interface 805, including: input unit 806, such as a keyboard and a mouse; output unit 807, such as various types of displays and speakers; storage unit 808, such as a magnetic disk and an optical disk; and communication unit 809, such as a network card, a modem, and a wireless communication transceiver. Communication unit 809 allows device 800 to exchange information/data with other devices via a computer network such as the Internet and/or various telecommunication networks.

The various processes and processing described above, for example, method 200 and/or method 500, may be performed by processing unit 801. For example, in some embodiments, method 200 and/or method 500 may be implemented as a computer software program that is tangibly included in a machine-readable medium such as storage space 808. In some embodiments, part of or all the computer program may be loaded into and/or installed onto device 800 via ROM 802 and/or communication unit 809. When the computer program is loaded to RAM 803 and executed by CPU 801, one or more actions of method 200 and/or method 500 described above may be performed.

The present disclosure may be a method, an apparatus, a system, and/or a computer program product. The computer program product may include a computer-readable storage medium on which computer-readable program instructions for performing various aspects of the present disclosure are loaded.

The computer-readable storage medium may be a tangible device that can hold and store instructions used by an instruction execution device. For example, the computer-readable storage medium may be, but is not limited to, an electric storage device, a magnetic storage device, an optical storage device, an electromagnetic storage device, a semiconductor storage device, or any suitable combination of the foregoing. More specific examples (a non-exhaustive list) of the computer-readable storage medium include: a portable computer disk, a hard disk, a random access memory (RAM), a read-only memory (ROM), an erasable programmable read-only memory (EPROM or a flash memory), a static random access memory (SRAM), a portable compact disc read-only memory (CD-ROM), a digital versatile disc (DVD), a memory stick, a floppy disk, a mechanical encoding device, for example, a punch card or a raised structure in a groove with instructions stored thereon, and any appropriate combination of the foregoing. The computer-readable storage medium used herein is not to be interpreted as transient signals per se, such as radio waves or other freely propagating electromagnetic waves, electromagnetic waves propagating through waveguides or other transmission media (e.g., light pulses through fiber-optic cables), or electrical signals transmitted through electrical wires.

The computer-readable program instructions described herein can be downloaded from a computer-readable storage medium to various computing/processing devices, or downloaded to an external computer or external storage device via a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from the network and forwards the computer-readable program instructions for storage in the computer-readable storage medium in each computing/processing device.

The computer program instructions for executing the operation of the present disclosure may be assembly instructions, instruction set architecture (ISA) instructions, machine instructions, machine-dependent instructions, microcode, firmware instructions, state setting data, or source code or object code written in any combination of one or more programming languages, including object oriented programming languages, such as Smalltalk, C++, and the like, and conventional procedural programming languages, such as the "C" language or similar programming languages. The computer-readable program instructions may be executed entirely on a user's computer, partly on a user's computer, as a stand-alone software package, partly on a user's computer and partly on a remote computer, or entirely on a remote computer or a server. In a case where a remote computer is involved, the remote computer may be connected to a user computer through any kind of networks, including a local area network (LAN) or a wide area network (WAN), or may be connected to an external computer (for example, connected through the Internet using an Internet service provider). In some embodiments, an electronic circuit, such as a programmable logic circuit, a field programmable gate array (FPGA), or a programmable logic array (PLA), may be customized by utilizing state information of the computer-readable program instructions. The electronic circuit may execute the computer-readable program instructions to implement various aspects of the present disclosure.

Various aspects of the present disclosure are described here with reference to flow charts and/or block diagrams of the method, the apparatus (system), and the computer program product implemented according to the embodiments of the present disclosure. It should be understood that each block of the flow charts and/or block diagrams and combinations of blocks in the flow charts and/or block diagrams can be implemented by computer-readable program instructions.

These computer-readable program instructions may be provided to a processing unit of a general-purpose computer, a special-purpose computer, or a further programmable data processing apparatus, thereby producing a machine, such that these instructions, when executed by the processing unit of the computer or the further programmable data processing apparatus, produce means (e.g., specialized circuitry) for implementing functions/actions specified in one or more blocks in the flow charts and/or block diagrams. These computer-readable program instructions may also be stored in a computer-readable storage medium, to cause a computer, a programmable data processing apparatus, and/or other devices to work in a specific manner, such that the computer-readable medium storing the instructions includes an article of manufacture that contains instructions for implementing various aspects of the functions/actions specified in one or more blocks in the flow charts and/or block diagrams.

The computer-readable program instructions may also be loaded to a computer, a further programmable data processing apparatus, or a further device, so that a series of operating steps may be performed on the computer, the further programmable data processing apparatus, or the further device to produce a computer-implemented process, such that the instructions executed on the computer, the further programmable data processing apparatus, or the further device may implement the functions/actions specified in one or more blocks in the flow charts and/or block diagrams.

The flow charts and block diagrams in the drawings illustrate the architectures, functions, and operations of possible implementations of the systems, methods, and computer program products according to various embodiments of the present disclosure. In this regard, each block in the flow charts or block diagrams may represent a module, a program segment, or part of an instruction, the module, program segment, or part of an instruction including one or more executable instructions for implementing specified logical functions. In some alternative implementations, functions marked in the blocks may also occur in an order different from that marked in the accompanying drawings. For example, two successive blocks may actually be executed in parallel, and sometimes they may also be executed in an inverse order, which depends on involved functions. It should be further noted that each block in the block diagrams and/or flow charts as well as a combination of blocks in the block diagrams and/or flow charts may be implemented using a special hardware-based system that executes specified functions or actions, or using a combination of special hardware and computer instructions.

Various embodiments of the present disclosure have been described above. The foregoing description is illustrative rather than exhaustive, and is not limited to the disclosed embodiments. Numerous modifications and alterations are apparent to those of ordinary skill in the art without departing from the scope and spirit of the illustrated embodiments. The selection of terms used herein is intended to best explain the principles and practical applications of the embodiments or technical improvements to technologies in the market, or to enable other persons of ordinary skill in the art to understand the embodiments disclosed herein.

The invention claimed is:

1. A method for managing storage blocks, comprising:
according to a first request for allocating a target number of consecutive storage blocks from a storage device, querying an index table that is used to record index information of a plurality of groups of consecutive idle storage blocks in the storage device to determine a first group of consecutive idle storage blocks from the plurality of groups of consecutive idle storage blocks,
wherein the index information of each group of consecutive idle storage blocks indicates a number and a starting position of each group of consecutive idle storage blocks, and the number of the first group of consecutive idle storage blocks is not less than the target number;
allocating the target number of consecutive storage blocks from the first group of consecutive idle storage blocks;
updating a bitmap that is used to record states of a plurality of storage blocks in the storage device,
wherein the state of each storage block indicates that each storage block is one of the following: an allocated storage block, a starting idle storage block and/or an ending idle storage block in a group of consecutive idle storage blocks, or an intermediate idle storage block in a group of consecutive idle storage blocks; and
updating first index information of the first group of consecutive idle storage blocks recorded in the index table.

2. The method according to claim 1, wherein updating the bitmap comprises:
if the number of the first group of consecutive idle storage blocks exceeds the target number,
updating the state of a starting first idle storage block in the first group of consecutive idle storage blocks to indicate that the first idle storage block is an allocated storage block;
determining at least one remaining consecutive idle storage block from the first group of consecutive idle storage blocks; and
updating the state of a starting second idle storage block in the at least one consecutive idle storage block to indicate that the second idle storage block is a starting idle storage block in a group of consecutive idle storage blocks.

3. The method according to claim 2, wherein updating the first index information comprises:
updating the first index information to record the number of the at least one consecutive idle storage block and a position of the second idle storage block.

4. The method according to claim 1, wherein updating the bitmap comprises:
if the number of the first group of consecutive idle storage blocks is equal to the target number, updating states of a starting first idle storage block and an ending third idle storage block in the first group of consecutive idle storage blocks, to indicate that both the first idle storage block and the third idle storage block are allocated storage blocks.

5. The method according to claim 4, wherein updating the first index information comprises:
removing the first index information from the index table.

6. The method according to claim 1, further comprising:
according to a second request for recycling an allocated target storage block, recycling the target storage block;
updating states of the target storage block and/or at least one adjacent idle storage block of the target storage block recorded in the bitmap; and
updating the index table to record second index information of a second group of consecutive idle storage blocks that comprises the target storage block.

7. The method according to claim 6, wherein updating the states of the target storage block and/or the at least one adjacent idle storage block recorded in the bitmap comprises:
if a fourth idle storage block immediately before the target storage block exists and a fifth idle storage block immediately after the target storage block does not exist,
updating the state of the fourth idle storage block to indicate that the fourth idle storage block is not an ending idle storage block in a group of consecutive idle storage blocks; and
updating the state of the target storage block to indicate that the target storage block is an ending idle storage block in a group of consecutive idle storage blocks.

8. The method according to claim 7, wherein updating the states of the target storage block and/or the at least one adjacent idle storage block recorded in the bitmap comprises:
if the fourth idle storage block does not exist but the fifth idle storage block exists,
updating the state of the target storage block to indicate that the target storage block is a starting idle storage block in a group of consecutive idle storage blocks; and
updating the state of the fifth idle storage block to indicate that the fifth idle storage block is not a starting idle storage block in a group of consecutive idle storage blocks.

9. The method according to claim 7, wherein updating the states of the target storage block and/or the at least one adjacent idle storage block recorded in the bitmap comprises:
- if neither the fourth idle storage block nor the fifth idle storage block exists, updating the state of the target storage block to indicate that the target storage block is a starting idle storage block and an ending idle storage block in a group of consecutive idle storage blocks.

10. The method according to claim 6, wherein updating the index table to record the second index information comprises:
- querying the updated bitmap to determine a starting sixth idle storage block and an ending seventh idle storage block in the second group of consecutive idle storage blocks;
- determining the number of the second group of consecutive idle storage blocks based on the sixth idle storage block and the seventh idle storage block; and
- updating the index table to record the number of the second group of consecutive idle storage blocks and a position of the sixth idle storage block.

11. The method according to claim 10, wherein the bitmap is divided into a plurality of parts, and each part has a counter to record the number of starting idle storage blocks and ending idle storage blocks in storage blocks corresponding to the part, and querying the updated bitmap comprises:
- during the query, skipping at least one part of the bitmap where the counter shows zero.

12. An electronic device, comprising:
- at least one processing unit; and
- at least one memory coupled to the at least one processing unit and storing instructions for execution by the at least one processing unit, wherein the instructions, when executed by the at least one processing unit, cause the electronic device to perform actions comprising:
  - according to a first request for allocating a target number of consecutive storage blocks from a storage device, querying an index table that is used to record index information of a plurality of groups of consecutive idle storage blocks in the storage device to determine a first group of consecutive idle storage blocks from the plurality of groups of consecutive idle storage blocks, wherein the index information of each group of consecutive idle storage blocks indicates a number and a starting position of each group of consecutive idle storage blocks, and the number of the first group of consecutive idle storage blocks is not less than the target number;
  - allocating the target number of consecutive storage blocks from the first group of consecutive idle storage blocks;
  - updating a bitmap that is used to record states of a plurality of storage blocks in the storage device, wherein the state of each storage block indicates that each storage block is one of the following: an allocated storage block, a starting idle storage block and/or an ending idle storage block in a group of consecutive idle storage blocks, or an intermediate idle storage block in a group of consecutive idle storage blocks; and
  - updating first index information of the first group of consecutive idle storage blocks recorded in the index table.

13. The device according to claim 12, wherein updating the bitmap comprises:
- if the number of the first group of consecutive idle storage blocks exceeds the target number,
  - updating the state of a starting first idle storage block in the first group of consecutive idle storage blocks to indicate that the first idle storage block is an allocated storage block;
  - determining at least one remaining consecutive idle storage block from the first group of consecutive idle storage blocks; and
  - updating the states of a starting second idle storage block and an ending third idle storage block in the at least one consecutive idle storage block, to indicate that the second idle storage block is a starting idle storage block in a group of consecutive idle storage blocks and the third idle storage block is an ending idle storage block in a group of consecutive idle storage blocks.

14. The device according to claim 13, wherein updating the first index information comprises:
- updating the first index information to record the number of the at least one consecutive idle storage block and a position of the second idle storage block.

15. The device according to claim 12, wherein updating the bitmap comprises:
- if the number of the first group of consecutive idle storage blocks is equal to the target number, updating states of a starting first idle storage block and an ending fourth idle storage block in the first group of consecutive idle storage blocks, to indicate that both the first idle storage block and the fourth idle storage block are allocated storage blocks.

16. The device according to claim 15, wherein updating the first index information comprises:
- removing the first index information from the index table.

17. The device according to claim 12, wherein the actions further comprise:
- according to a second request for recycling an allocated target storage block, recycling the target storage block;
- updating states of the target storage block and/or at least one adjacent idle storage block of the target storage block recorded in the bitmap; and
- updating the index table to record second index information of a second group of consecutive idle storage blocks that comprises the target storage block.

18. The device according to claim 17, wherein updating the state of the target storage block and/or the at least one adjacent idle storage block recorded in the bitmap comprises:
- if a fourth idle storage block immediately before the target storage block exists and a fifth idle storage block immediately after the target storage block does not exist,
  - updating the state of the fourth idle storage block to indicate that the fourth idle storage block is not an ending idle storage block in a group of consecutive idle storage blocks; and
  - updating the state of the target storage block to indicate that the target storage block is an ending idle storage block in a group of consecutive idle storage blocks.

19. The device according to claim 18, wherein updating the state of the target storage block and/or the at least one adjacent idle storage block recorded in the bitmap comprises:
- if the fourth idle storage block does not exist but the fifth idle storage block exists,
  - updating the state of the target storage block to indicate that the target storage block is a starting idle storage block in a group of consecutive idle storage blocks; and updating the state of the fifth idle storage block to indicate that the fifth idle storage block is not a starting idle storage block in a group of consecutive idle storage blocks.

20. The device according to claim 18, wherein updating the state of the target storage block and/or the at least one adjacent idle storage block recorded in the bitmap comprises:
if neither the fourth idle storage block nor the fifth idle storage block exists, updating the state of the target storage block to indicate that the target storage block is a starting idle storage block and an ending idle storage block in a group of consecutive idle storage blocks.

21. The device according to claim 17, wherein updating the index table to record the second index information comprises:
querying the updated bitmap to determine a starting sixth idle storage block and an ending seventh idle storage block in the second group of consecutive idle storage blocks;
determining the number of the second group of consecutive idle storage blocks based on the sixth idle storage block and the seventh idle storage block; and
updating the index table to record the number of the second group of consecutive idle storage blocks and a position of the sixth idle storage block.

22. The device according to claim 21, wherein the bitmap is divided into a plurality of parts, and each part has a counter to record the number of starting idle storage blocks and ending idle storage blocks in storage blocks corresponding to the part, and querying the updated bitmap comprises:
during the query, skipping at least one part of the bitmap where the counter shows zero.

23. A computer program product having a non-transitory computer readable medium which stores a set of instructions to manage storage blocks; the set of instructions, when carried out by computerized circuitry, causing the computerized circuitry to perform a method of:
according to a first request for allocating a target number of consecutive storage blocks from a storage device, querying an index table that is used to record index information of a plurality of groups of consecutive idle storage blocks in the storage device to determine a first group of consecutive idle storage blocks from the plurality of groups of consecutive idle storage blocks, wherein the index information of each group of consecutive idle storage blocks indicates a number and a starting position of each group of consecutive idle storage blocks, and the number of the first group of consecutive idle storage blocks is not less than the target number;
allocating the target number of consecutive storage blocks from the first group of consecutive idle storage blocks;
updating a bitmap that is used to record states of a plurality of storage blocks in the storage device,
wherein the state of each storage block indicates that each storage block is one of the following: an allocated storage block, a starting idle storage block and/or an ending idle storage block in a group of consecutive idle storage blocks, or an intermediate idle storage block in a group of consecutive idle storage blocks; and
updating first index information of the first group of consecutive idle storage blocks recorded in the index table.

* * * * *